(12) United States Patent
Affleck (10) Patent No.: US 9,855,876 B2
(45) Date of Patent: Jan. 2, 2018

(54) METHOD AND APPARATUS FOR LOADING RAILCARS WITH CROP MATERIAL

(71) Applicant: Sheldon Affleck, Regina Saskatchewan (CA)

(72) Inventor: Sheldon Affleck, Regina Saskatchewan (CA)

( * ) Notice: Subject to any disclaimer, the term of this patent is extended or adjusted under 35 U.S.C. 154(b) by 0 days.

(21) Appl. No.: 14/334,144

(22) Filed: Jul. 17, 2014

(65) Prior Publication Data

US 2015/0023767 A1     Jan. 22, 2015

(30) Foreign Application Priority Data

Jul. 17, 2013   (CA) .................................. 2821182

(51) Int. Cl.
| | |
|---|---|
| *B65G 67/20* | (2006.01) |
| *B61D 17/08* | (2006.01) |
| *B60P 1/42* | (2006.01) |
| *B65G 67/04* | (2006.01) |
| *B65G 69/00* | (2006.01) |
| *B65G 41/00* | (2006.01) |

(Continued)

(52) U.S. Cl.
CPC .............. *B60P 1/42* (2013.01); *B65G 41/002* (2013.01); *B65G 41/008* (2013.01); *B65G 67/04* (2013.01); *B65G 69/00* (2013.01); *G01G 19/12* (2013.01); *G01G 23/3735* (2013.01)

(58) Field of Classification Search
CPC .. A01D 43/087; A01D 43/085; A01D 43/086; A01D 90/10; G01G 19/08; G01G 19/12; G01G 11/08; G01G 13/16; G01G 13/24; G01G 19/047; B65G 65/40; B65G 65/46
See application file for complete search history.

(56) References Cited

U.S. PATENT DOCUMENTS

| | | | | |
|---|---|---|---|---|
| 4,376,609 A | * | 3/1983 | Bohman | A01D 43/073 356/138 |
| 4,659,274 A | * | 4/1987 | France | B65G 67/22 177/163 |

(Continued)

FOREIGN PATENT DOCUMENTS

| | | | | |
|---|---|---|---|---|
| EP | 2561746 A1 | * | 2/2013 | ........... A01D 43/086 |
| WO | WO 2011101458 A1 | * | 8/2011 | ......... A01D 41/1217 |
| WO | WO 2013068574 A1 | * | 5/2013 | ........... A01D 43/087 |

*Primary Examiner* — Gregory Adams
(74) *Attorney, Agent, or Firm* — Patterson Thuente Pedersen, P.A.

(57) ABSTRACT

Methods and apparatuses for loading a railcar with crop material. A grain cart has a frame, ground wheels, a hitch assembly, a storage container and an auger assembly having a discharge end for removing particulate material from the storage container discharging it out the discharge end. A spout can be moveably connected to the discharge end of the auger. The method can include loading the storage container of the grain cart with crop material, maneuvering the grain cart adjacent to a railcar using a tow vehicle and discharging crop material from the storage container of the grain cart into the railcar using the auger assembly. A mobile computer or other processing device can be used to determine how much crop material is being loaded into the railcar during the loading by the grain cart.

9 Claims, 8 Drawing Sheets

(51) Int. Cl.
*G01G 19/12* (2006.01)
*G01G 23/37* (2006.01)

(56) References Cited

U.S. PATENT DOCUMENTS

| | | | | |
|---|---|---|---|---|
| 5,575,316 A * | 11/1996 | Pollklas | ............... | A01D 43/073 141/198 |
| 6,296,435 B1 * | 10/2001 | Wood | ........................ | B60P 1/42 198/536 |
| 6,776,569 B1 * | 8/2004 | McMahon | ................ | B60P 1/40 198/666 |
| 6,943,824 B2 * | 9/2005 | Alexia | ................. | A01D 43/073 348/120 |
| 7,168,554 B2 * | 1/2007 | Brandt | ....................... | B60P 1/42 198/668 |
| 7,205,490 B2 * | 4/2007 | Van Mill | ................ | G01G 19/08 177/136 |
| 7,411,136 B2 * | 8/2008 | Walker | ................... | G01G 13/24 141/83 |
| 7,644,816 B2 * | 1/2010 | Veiga Leal | ........ | A01D 41/1217 193/22 |
| 7,762,290 B2 * | 7/2010 | Schroeder | .............. | B65G 67/22 141/2 |
| 8,097,820 B2 * | 1/2012 | Klubertanz | ............ | G01G 19/12 177/116 |
| 8,203,459 B2 * | 6/2012 | Jones | ..................... | G06Q 10/06 177/136 |
| 2009/0044505 A1 * | 2/2009 | Huster | ................. | A01D 43/087 56/10.2 R |
| 2010/0193256 A1 * | 8/2010 | Klubertanz | ............ | G01G 23/42 177/145 |
| 2010/0209223 A1 * | 8/2010 | Van Mill | ................ | B60P 1/42 414/526 |
| 2012/0099948 A1 * | 4/2012 | Bump | .................... | G01G 13/16 414/21 |

* cited by examiner

METHOD AND APPARATUS FOR LOADING RAILCARS WITH CROP MATERIAL

RELATED APPLICATIONS

This application claims the benefit of Canadian Application No. 2,821,182 filed Jul. 17, 2013, said prior application being hereby fully incorporated by reference herein.

FIELD OF THE INVENTION

The present invention relates to methods and apparatuses for loading railcars with crop material.

BACKGROUND OF THE INVENTION

Traditionally, grain and other crop materials are loaded into railcars to be transported by railroad using what is generally referred to as a grain elevator. A grain elevator is a building that is typically located adjacent to a rail line where farmers can haul their grain or other crop materials to be collected and stored. The grain elevator will act as a storage facility for the grain; storing it in one of a number of large silos or other storage facilities in the grain elevator along with grain from other farmers. A railway siding will run adjacent to a stationary dispensing assembly where periodically a number of railcars will be directed to the railway siding and loaded with grain from the grain elevator using the dispensing assembly. The loaded railcars will then be ready for transport on the rail lines.

However, grain elevators need to be constructed at a specific location along a rail line and are permanent, stationary buildings. As a result, a limited number of grain elevators have been constructed in the past (usually placed in towns near the rail way lines) and farmers have to transport their grain or other crop material to the nearest grain elevator. This often results in the farmer having to travel long distances to haul their grain to a grain elevator where it will be stored until it is eventually loaded on a railcar.

At one time, grain elevators were relatively small (at least compared to modern grain elevators) and it was common in many places to have grain elevators on branch lines, rather than just the main lines. However, more recently grain companies have tended to create ever larger capacity grain elevators, typically forming them of concrete and making them larger and larger and capable of storing more and more grain. This however has resulted in the grain companies building fewer and fewer of these large capacity grain elevators with these high capacity concrete grain elevators being constructed only on main lines, leaving branch lines that used to have smaller wooden grain elevators either with old, unused or abandoned grain elevators or no grain elevators after they have been demolished. This has left a lot of farmers having to transport their grain even longer distances to reach one of these remaining high capacity grain elevators and many grain elevator sidings that used to contain smaller grain elevators unused.

SUMMARY OF THE INVENTION

In one aspect, a grain cart for loading a railcar with particulate material is provided. The grain cart comprises: a frame; ground wheels supporting the frame; a hitch assembly connected to the frame and adapted for connection to a tow vehicle for towing the grain cart; a storage container supported by the frame; an auger assembly having an intake end, a main body and a discharge end, the intake end extending into the storage container so that particulate material from the storage container can enter the intake end, be carried up the main body and discharged out the discharge end; and a spout moveably connected to the discharge end of the auger, the spout moveable to discharge particulate material closer to and further away from the grain cart.

In another aspect, a method for loading a railcar with crop material is provided. A grain cart can be provided having a frame, ground wheels supporting the frame, a hitch assembly connected to the frame, a storage container supported by the frame, an auger assembly having an intake end, a main body and a discharge end, the intake end extending into the storage container so that particulate material from the storage container can enter the intake end, be carried up the main body and discharged out the discharge end and a spout moveably connected to the discharge end of the auger. A tow vehicle can also be provided connected to the grain cart by a hitch assembly. The method can include loading the storage container of the grain cart with crop material, maneuvering the grain cart adjacent to a railcar using the tow vehicle with the discharge end over an opening in the railcar and discharging crop material from the storage container of the grain cart into the railcar using the auger assembly of the grain cart.

In a further aspect, a data processing device for determining how much crop material has been loaded into a railcar can be provided. The device comprises at least one memory operative to store data, program instructions and an initial load weight of crop material in a railcar, a wireless communication interface operative to wireless receive data, a display, at least one processing unit operatively connected to the at least one memory, the wireless communication interface and the display. The at least one processing unit operative to in response to the program instructions in the at least one memory receive an initial weight of crop material in a grain cart from a load cell on the grain cart using the wireless communication interface, during a discharging of the crop material in the grain cart into the rail car, repeatedly receiving weight measurements of crop material remaining in the grain cart from the load cell on the grain cart using the wireless communication interface, and when the weight measurements have remained the same for a period of time, determining a new load weight of crop material in the rail car and saving the new load weight of crop material in the railcar in the at least one memory.

A method and grain cart is disclosed that can load a number of railcars on a siding without requiring the infrastructure of a stationary grain elevator. A farmer can transport his grain or other crop material to a location near a railway siding using and truck and trailer (or just a grain truck) where railcars are present for loading. At this location, conveyor or auger can be used to unload the crop material from the farmer's trailer or truck into a grain cart with an extended auger assembly. The grain cart can be hitched to a tractor. Once the grain cart is loaded with the farmer's grain, the grain cart can be maneuvered by the tractor alongside a first railcar and using the auger assembly, the crop material from the grain cart can be loaded into the railcar. When the first railcar is full, the grain cart can be moved to the next railcar and begin loading the crop material into the next railcar. When the grain cart is full, the grain cart can be taken back to the conveyor or auger to be loaded with crop material from the next farmer's trailer or truck.

This method allows a farmer to have their grain loaded directly into a railcar using the grain cart; dispensing with the need to have a conventional stationary grain elevator. Because the grain elevator is no longer needed, the railcars do not need to be taken to a grain elevator for loading but can be loaded at any suitable siding by simply transporting the necessary equipment to perform the method to the siding. The siding used will usually require minimal preparing, simply needing a place for the farmer to get near enough to unload his or her truck or trailer and a relatively flat surface running adjacent to the siding where the grain cart can be pulled along beside the railcars using the tractor.

Additionally, a number of benefits are realized by the fact that the railcars remain stationary while the grain cart is used to load the railcars. When a railcar is loaded at a grain elevator, the railcars must be moved for them to be loaded. Each railcar has to be moved under a loading assembly that remains stationary so that the grain can be discharged into the railcar. When one railcar has been loaded, all of the railcars must be moved so that the next rail car is positioned under the stationary loading assembly. The loading of the railcars using the present method is much safer since the railcars remain stationary during the loading and can have their manual brakes on. Rather than having a number of railcars being repeatedly moved during their loading, in the present method only the much smaller grain cart and the tractor pulling it are moving.

Because the railcars remain stationary during the loading in the present method, the number of railcars loaded at a given railway siding can be increased in comparison to a stationary loading facility. With a stationary loading facility room must be left on the railway siding so that all of the railcars can be moved forward after each railcar is loaded. This requires the railway siding to have enough free space so that all of the railcars can be maneuvered under the stationary loading assembly. With the present method, because the grain cart is moved relative to the stationary railcars, the railway siding can be filled with railcars since room does not have to be left to move all of the railcars under a stationary loading assembly. Rather, the railway siding can be filled with railcars and the grain cart moved to each of the stationary railcars.

The equipment necessary to load the railcars can be moved from railway siding to railway siding, so one set of equipment including the grain cart and tractor can be used to load railcars at numerous different railway sidings. This can also allow the equipment to be moved to any suitable railway siding and quickly establish the railway siding as a temporary loading location. It can also take advantage of sidings on branch lines that have been abandoned in favor of large capacity grain elevators on main lines by the grain companies. This can save the farmers substantial cost and time and allow loading at railway sidings where there might not be enough demand to provide a stationary grain elevator.

BRIEF DESCRIPTION OF THE DRAWINGS

A preferred embodiment of the present invention is described below with reference to the accompanying drawings, in which.

DETAILED DESCRIPTION OF THE DRAWINGS

FIGS. 1-4 illustrate a grain cart 10 that can be used to load a railcar (not shown). The grain cart 10 can include: a hopper or storage container 20; a frame 30; ground wheels 40; a hitch assembly 50; and an auger assembly 60.

The storage container 20 is used to hold crop material or other particulate material and is supported by the frame 30. The ground wheels 40 are provided on the frame 30 so that the grain cart 10 can be moved across the ground. Although in some cases the grain cart 10 could be supported by ground wheels that are simply wheels, in one aspect ground wheels 40 could form part of tracks which can provide better floatation of the grain cart 10 over muddy ground and allow the grain cart 10 to be towed over ground that might be hard to traverse using wheels alone.

A hitch assembly 50 is provided at one end of the grain cart 10 so that the grain cart 10 can be hitched to and towed by a tow vehicle (not shown) and towed generally in a direction of travel, T. A power takeoff (PTO) assembly 55 can be provided so that the auger assembly 60 can be powered off the PTO of the tractor pulling the grain cart 10.

Crop material or some other particulate material can be loaded into the storage container 20 which has side walls 22, 24 that can slope inwards towards their bottoms, a front wall 26 and a back wall 28 that all together form a holding space 29.

Load cells 42 can be used in conjunction with the storage container 20 so that the weight of the crop material or other particulate material loaded into the storage container 20 can be measured. Typically, the load cells 42 are positioned between the frame 30 and an axle supporting the wheels 40.

To empty the storage container 20, the auger assembly 60 can be used to empty the holding space 29. The auger assembly 60 can have an intake end 62 extending into the storage container 20 for collecting crop material from the hopper 20, a main body 63 and a discharge end 64 where the crop material is discharged from the auger assembly 60. Crop material or other particulate material in the storage container 20 can enter the auger assembly 60 at the intake end 62, be carried up the main body 63 of the auger assembly 60 and discharged out the discharge end 64. Typically, a conveyor 27, such as an auger or a belt conveyor, can be provided in the bottom of the storage container 20, at the bottom of the sloping side walls 22, 24, so that particulate material in the storage container 20 can be directed towards the conveyor 27 by the side walls 22, 24 and when it reaches the conveyor 27, carried towards the intake end 62 of the auger assembly 60 by the conveyor 27.

For transport, the auger assembly 60 the main body 63 can be made up of a lower auger portion 66 and an upper auger portion 68 with the lower auger portion 66 and upper auger portion 68 being pivotally attached relative to one another. The lower auger portion 66 can begin at the intake end 62 and extend upwards. Typically, the lower auger portion 66 will be much longer than a conventional grain cart's lower auger portion, with the lower auger portion 66 of the grain cart 10 having a top end 67 extending above a top of the storage container 20. The upper auger portion 68 can be pivotally attached at a bottom end 69 to the lower auger portion 66 and extend to the discharge end 68.

Figure 1:
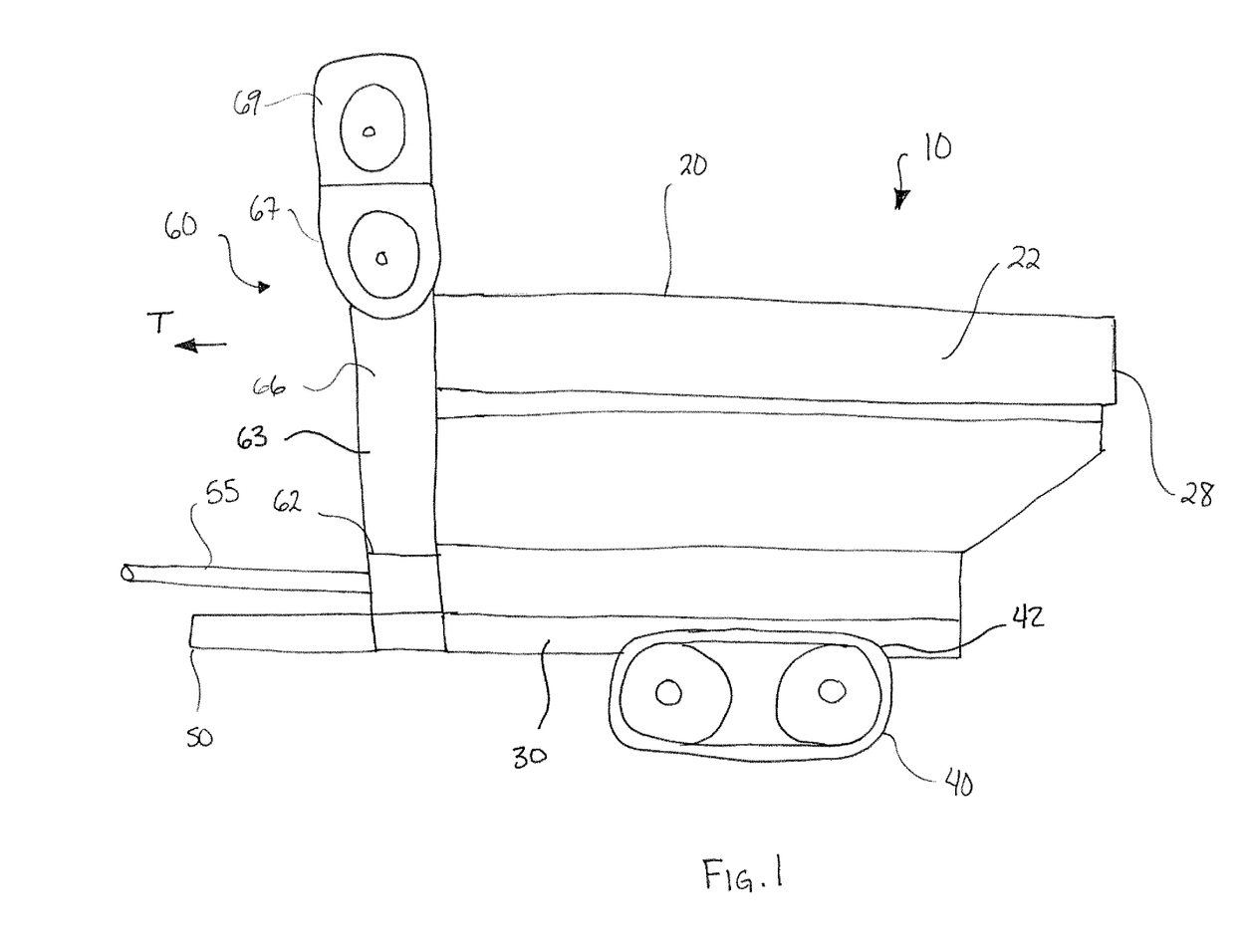
FIG. 1 illustrates a side view of a grain cart.
Figures 2, 3:
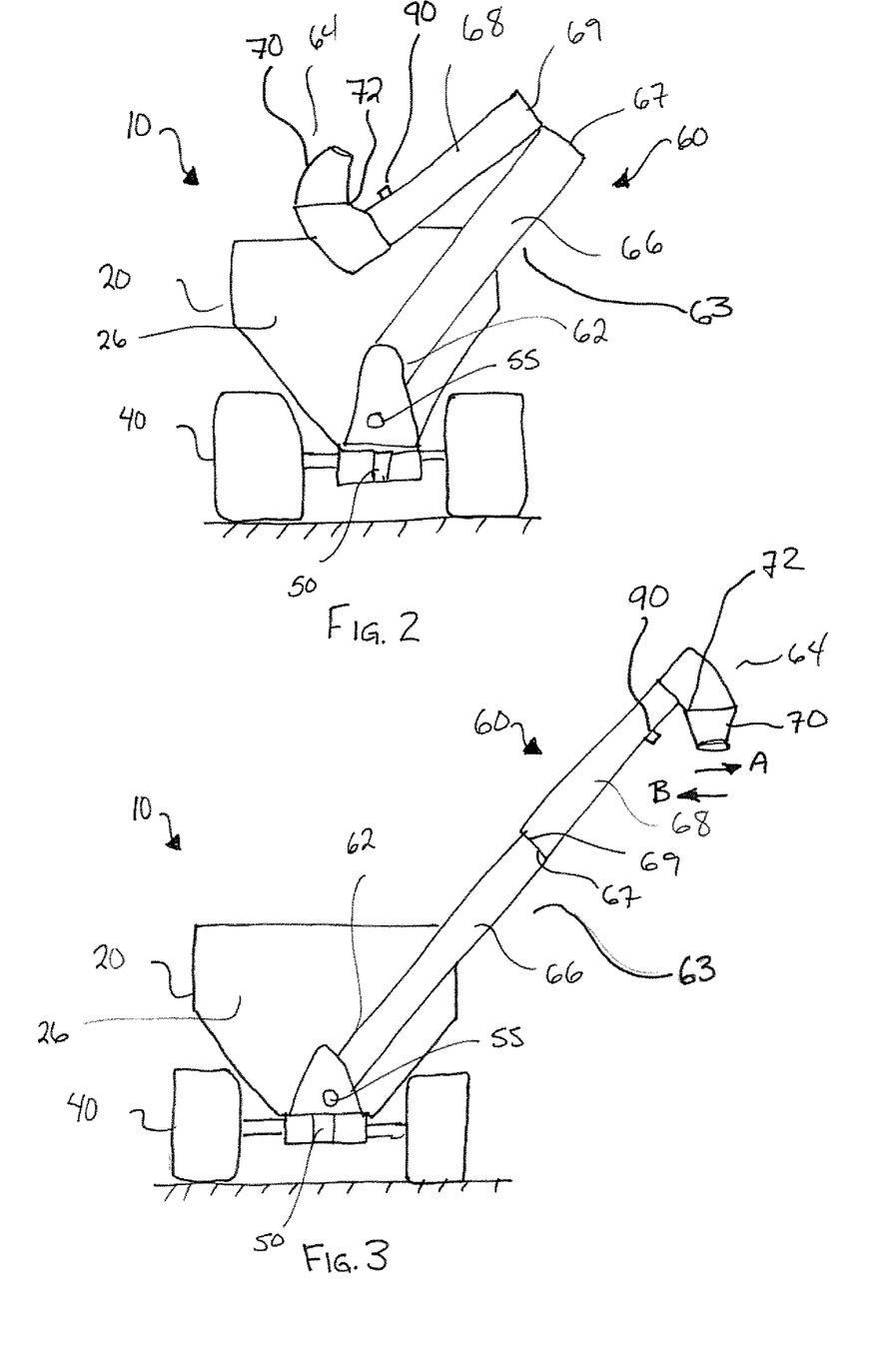
FIG. 2 illustrates a front view of the grain cart of FIG. 1 with an auger assembly in a folded position.
FIG. 3 illustrates a front view of the grain cart of FIG. 1 with the auger assembly in an operating position.
Figure 4:
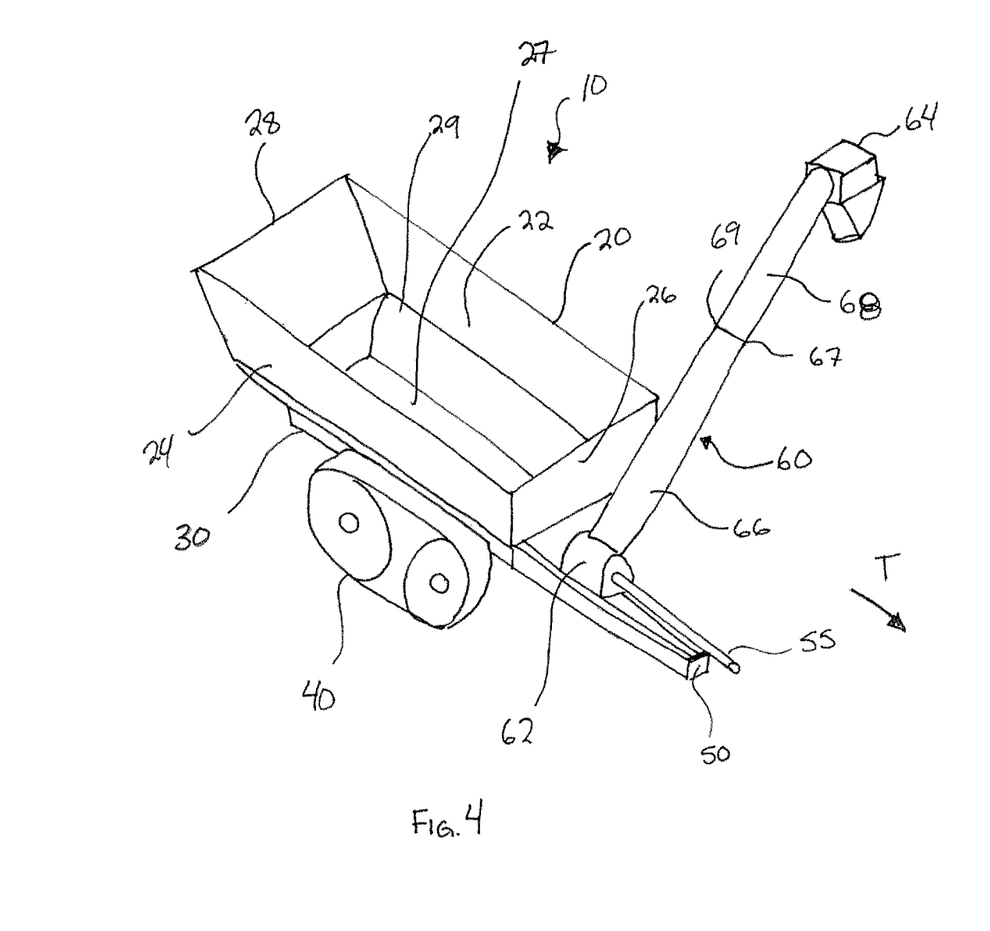
FIG. 4 illustrates a perspective view of the grain cart of FIG. 1.

In operation, the upper auger portion 68 is pivoted so that it is coaxial with the lower auger portion 66 and particulate material can be removed from the storage container 20 through the intake end 62 carried up the lower auger portion 66 and the upper auger portion 68 to be discharged out the discharge end 64 of the auger assembly as shown in FIG. 3.

For transport, the upper auger portion 68 can be pivoted relative to the lower auger portion 66 so that the upper auger portion 68 and the lower auger portion 66 are positioned somewhat adjacent to one another as shown in FIG. 2.

Figure 5:
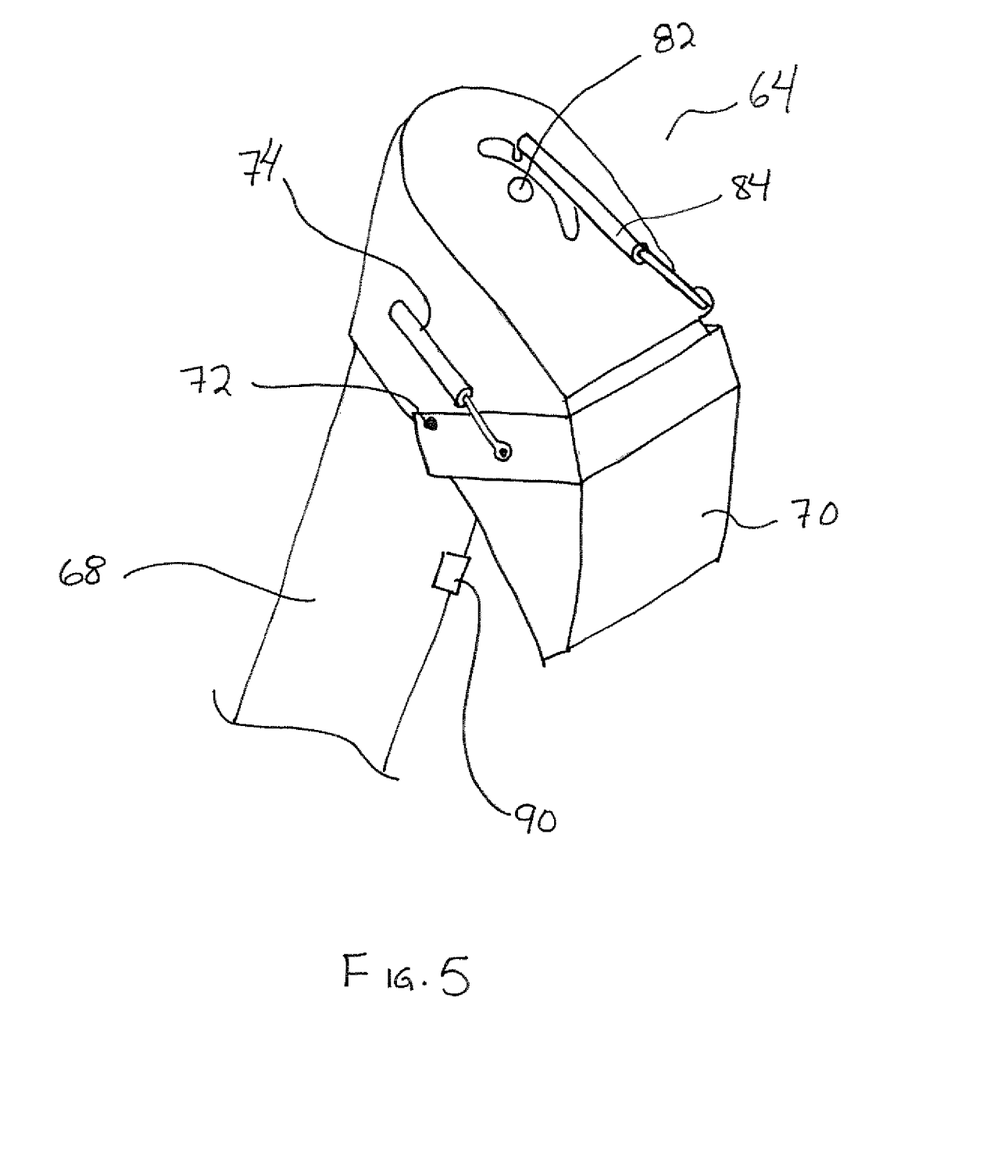
FIG. 5 illustrates a detailed view of a discharge end of the auger assembly.

FIG. 5 illustrates a more detailed view of the discharge end 64 of the auger assembly 60. Particulate material from the storage container 20 of the grain cart 10 is carried up the main body 63 to the discharge end 64 of the auger assembly 60 where it will be directed through the discharge end 64 into a waiting railcar.

The discharge end 64 can be provided with a spout 70 that acts to direct the discharging particulate material in a specific direction. The spout 70 can be moveably connected to the discharge end 64 of the auger assembly 60 so that the spout 70 can be moved relative to the discharge end 64 and alter the direction of the path of discharging particulate material being discharged out of the spout 70. In one aspect, the spout 70 can be pivotally connected to the discharge end 64 of the auger assembly 60 at a pivot connection 72.

Referring to FIG. 3, in operation the spout 70 can be moved relative to the discharge end 64 of the auger assembly 60 so that particulate material being discharged out of the auger assembly 60 through the spout 70 can be discharged either further away from the grain cart 10 (direction A shown in FIG. 3) or closer to the grain cart 10 (direction B shown in FIG. 3). When the grain cart 10 is being towed in the direction of travel, T, particulate material will be discharged from the spout 70 in a path that is also in the direction of travel, T. By moving the spout 70 in direction A, this path can be moved further away from the side of the grain cart 10 and by moving the spout 60 in direction B, this path can be moved closer to the side of the grain cart 10. In this manner, the path of the discharging particulate material can be "fine-tuned" as the grain cart 10 is being pulled in direction, T, and being used to load a railcar.

A first actuator 74, such as a hydraulic ram, can be connected between the discharge end 64 and the spout 70 so that the first actuator 74 can pivot the spout 70 around the pivot connection 72 and relative to the discharge end 64 to move the spout 70 relative to the discharge end 64 and alter the direction of the path of particulate material being discharged out the spout 70.

By retracting the first actuator 74 and pivoting an end of the spout 70 so that the spout aims further away from the upper auger portion 68, the spout 70 can be moved relative to the discharge end 64 of the auger assembly 60 to direct particulate material in a direction further away from the grain cart 10. By extending the actuator 74, the end of the spout 70 can be pivoted closer to the upper auger assembly 68, directing the particulate material exiting the spout 70 closer to the grain cart 10.

The discharge end 64 and the spout 70 of the auger assembly 60 can also be pivotally attached to an end of the main body 63 of the auger assembly 60. The discharge end 64 can be pivotally connected to a top end of the upper auger assembly 68 so that the discharge end 64 can pivot around pivot connection 82, allowing the discharge end 64 and the spout 70 to pivot on the end of the upper auger assembly 64 in a plane substantially perpendicular to a length of the upper auger portion 68. A second actuator 84, such as a hydraulic ram, can be provided that is operative to pivot the discharge end 64 relative to the upper auger portion 68.

The first actuator 74 and the second actuator 84 can be remotely controllable by an operator of a tow vehicle from the tow vehicle, so that the operator controlling the first actuator 74 and the second actuator 84 can direct particulate material exiting the spout 70 to be directed closer to the grain cart 10 or further away by selectively controlling the first actuator 74 and rotate the spout 70 relative to the upper auger portion 68 by selectively controlling the second actuator 84.

So that an operator of a tow vehicle towing the grain cart 10 knows where the particle material exiting the spout 70 is being directed, a video camera 90 can be provided that is directed at the particulate material exiting the spout 70 to capture images of particulate material being discharged from the spout 70. The operator of the tow vehicle can be provided with a display in the cab of the tow vehicle showing the images being taken by the video camera 90. Using these images, the operator will not only know where to direct the tow vehicle pulling the grain cart 10, but also can use the video being taken by the video camera 90 to operate the first actuator 74 and the second actuator 84 to control where the spout 70 is directing the particulate material. The first actuator 74 and second actuator 84 can be controlled by the operator using any suitable control system, but in one aspect, a joystick control system could be provided to control the first actuator 74 and the second actuator 84.

Figure 6:
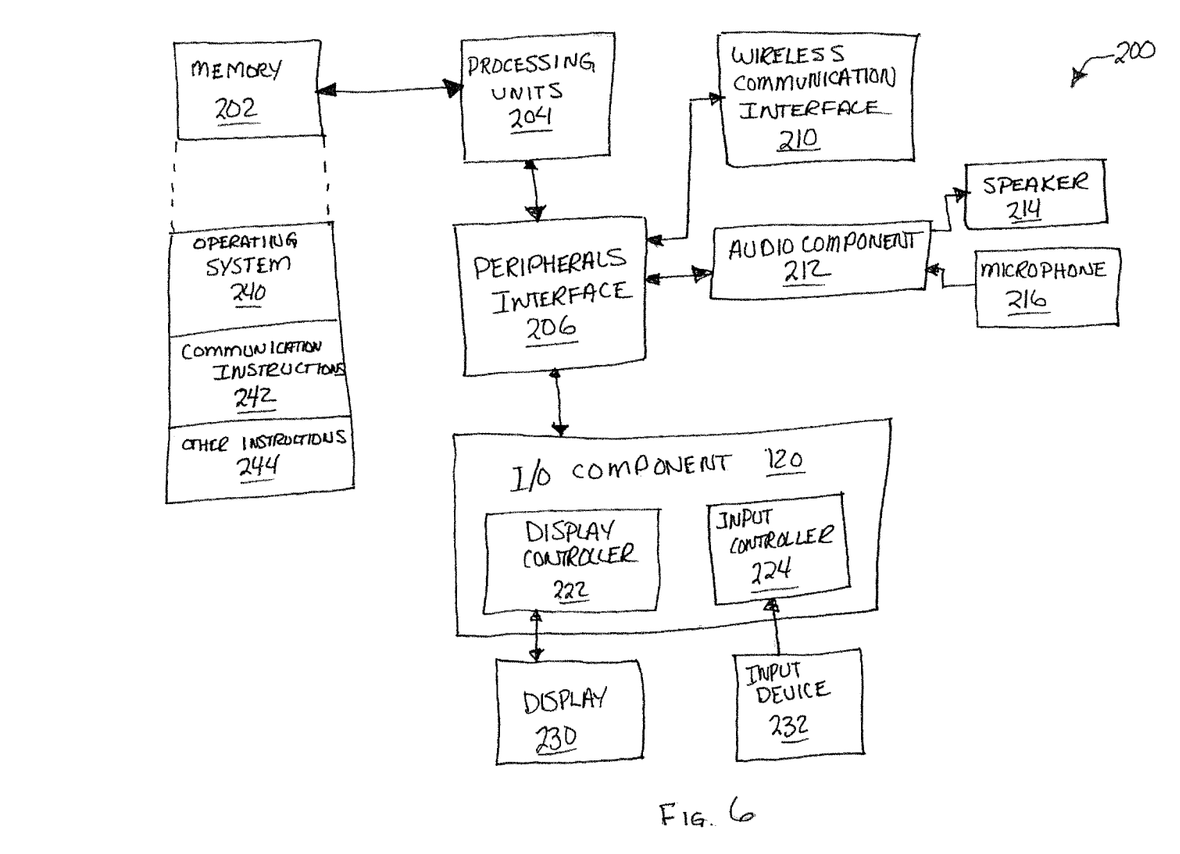
FIG. 6 is a block diagram of an exemplary implementation of a data processing device that can be used with the grain cart of FIG. 1.

In one aspect, a data processing device 200, such as smart phone, other mobile device or computer can be provided that can receive data from the video camera 90 in the form of captured images and/or streamed video. The data processing device 200 can also be used to control the first actuator 74 and the second actuator 84 and/or receive data from the load cells 42. FIG. 6 is a block diagram of an exemplary implementation of the data processing system 200 in the form of a mobile device. The data processing device 200 can include at least one computer readable memory 202, one or more processing units 204 and a peripherals interface 206. The at least one memory 202, the one or more processing units 204 and the peripherals interface 206 can be separate components or can be provided in one or more integrated circuits.

Subsystems can be operatively connected to the peripherals interface 206 to provide additional functionality. A wireless communication interface 210 can be operatively connected to the peripherals of interface 206 which can be used to wireless communicate with other devices. The wireless communication interface 210 can include radio frequency receivers and transmitters for communicating with other devices using various wireless communication standards including IEEE 802.11, Wi-Fi, WiMax, Bluetooth™, etc.

An audio component 212 can be included for playing sounds over a speaker 214. Optionally, the audio component 212 could also include a microphone 216 for receiving voice commands, recording audio, etc.

An I/O component 220 can be provided to allow input devices to input data to the data processing system 200 using an input controller 222 and output data for displaying information using a display controller 226. Input devices 232 such as buttons, keyboards, etc. can be provided for providing input to the input controller 222. Although a simply display could be used to display information, it is now common for a touch screen display 230 to be provided that allows the display of information and the inputting of information through touching the screen of the display 230 so the display controller 222 can be a touch screen controller operative to both display data on the display 230 and receive inputs from the display 230 in the form of a user touching the display 230.

The computer readable memory 202 can include high-speed random access memory and/or non-volatile memory, such as one or more magnetic disk storage devices, one or more optical storage devices, and/or flash memory. The memory 202 can store an operating system 240 and the operating system 240 may include instructions for handling basic system services and for performing hardware dependent tasks.

The memory 202 can also store communication instructions 242 to facilitate communicating with one or more additional devices and/or other software instructions 244 that may be necessary or desirable to provide all the desired functionality of the data processing device 200.

The data processing device 200 may include additional components such as busses, interfaces, etc. (not shown) in order to provide the desired functionality.

The data processing device 200 can be operatively connected through the wireless communication interface 210 to the video camera 90 so that images and video captured by the video camera 90 can be transmitted to the data processing device 200 and displayed by the data processing device 200 on the display 230. In this manner, a user of the data processing device 200 can view the particulate material being discharged out of the spout 70 of the grain cart 10 on the display 230 of the data processing device 200. In this manner, an operator of a tractor or other tow vehicle pulling the grain cart 10 can place the data processing device 200 in the cab of the vehicle with him or her and watch the video being captured by the video camera 90 on the display 230 of the data processing device 200. The operator can then use the video being shown to fine-tune the positioning of the spout 70 relative to the discharge end 64 of the auger assembly 60 to direct the discharging particulate material in a desired direction, such as an opening in the top of a railcar being loaded to be loaded with particulate material from the grain cart 10.

In one aspect, the data processing device 200 can also be operatively connected through the wireless communication interface 210 to a controller for the first actuator 74 and the second actuator 84 to allow a person using the data processing device 200 to control the operation of the first actuator 74 and the second actuator 84 using the data processing device 200.

Additionally, the data processing device 200 can be operatively connected to the load cells 42 so that weight measurements made by the load cells 42 can be wirelessly transmitted to the data processing device 200 for display on the display 230 or for use in application programs being run by the data processing device 200.

Figure 7:
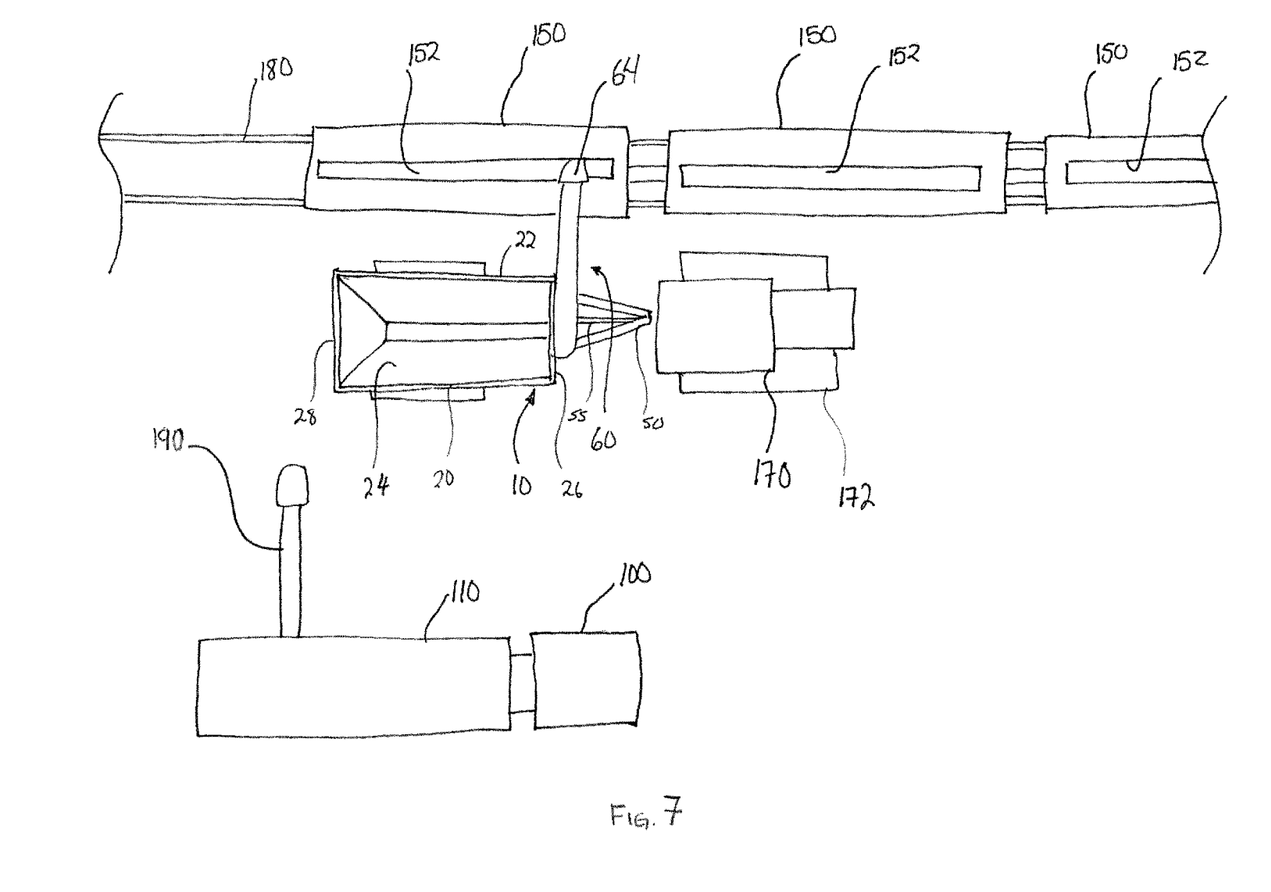
FIG. 7 is a schematic illustration of a grain cart being used to load a rail car.

FIG. 7 illustrates the grain cart 10 being used to load grain or other particulate material from a truck 100 and trailer 110, such as a super B, into a rail car 150 provided on rail line 180. The grain cart 10 can be hitched to a tow vehicle 170 such as a tractor. A conveyor 190, such as an auger conveyor or belt conveyor, can be provided to unload the crop material from the trailer 110 into the storage container 20 of the grain cart 10.

A farmer can transport his or her crop material to a location adjacent to the rail line 110 near where the railcars 150 are to be loaded is located. At this location the farmer can unload this trailer 100 into the grain cart 10. Although FIG. 7 only shows three railcars 150 any number of railcars 150 positioned on the rail line 180 could be loaded in this manner. Typically, the loading will be done with the conveyor 190 near the siding where the railcars 150 are provided and at a spot that is suitable for the truck 100 and trailer 110 to drive up to and be unloaded. Using the conveyor 190 the crop material can be loaded into storage container 20 of the grain cart 10.

Once the crop material has been loaded into the storage container 20 of the grain cart 10, the load cells 42 of the grain cart 10 can be used to take a measurement of the weight of the crop material that has been loaded into the storage container 20 of the grain cart 10. A scale ticket showing this weight can then be printed and given to the driver of the truck 100.

With the crop material loaded into the storage container 20 of the grain cart 10 and the weight of the crop material determined by the load cells, the grain cart 10 can be used to directly load the crop material from the grain cart 10 into the one of the railcars 150. The tow vehicle 170 can pull the grain cart 10 alongside of one of the railcars 150 so that the discharge end 64 of the auger assembly 60 is provided over top of an opening 152 in the top of the railcar 150. These openings 152 can be a number of smaller hatches or they could be one or more long trough-like opening through which the crop material can be loaded into the interior compartments of the railcar 150.

The auger assembly 60 on the grain cart 10 can then be used to empty the crop material from the storage container 20 of the grain cart 10 and discharge it directly into the railcar 150 through the opening 152.

Not only can an operator of the tow vehicle 170 use the tow vehicle 170 to maneuver the discharge end 64 of the auger assembly 60 on the grain cart 10 so that it is positioned over the opening 152 in the railcar 150, but the operator can also more finely control where the crop material is being discharged using the video camera 90 and the first actuator 74 and the second actuator 84. Once the operator has maneuvered the grain cart 10 relative to the railcar 150 so that the discharge end 64 and the spout 70 of the auger assembly 60 are generally positioned over the opening 152 in the railcar 150, the operator can view the video being taken by the video camera 90 to adjust the positioning of the spout 70 and direct it to discharge the crop material through the opening 152 using the first actuator 174 and the second actuator 184 to control the direction of the spout 70 and more finely direct the discharging crop material through the opening 152 in the railcar 150. In one aspect, the video being taken by the video camera 90 can be displayed to the operator on the display 230 of the data processing device 200 operatively connected to the video camera 90.

Once the auger assembly 60 is operating and crop material is being discharged out the discharge end 64, the operator in the tow vehicle 170 can continue to watch the display of the video being taken by the video camera 90 of the crop material exiting the spout 70 and fine-tune its direction by controlling the first actuator 74 and the second actuator 84.

When the grain cart 10 has been emptied of crop material, the tow vehicle 170 can be used to drive the grain cart 10 back to the conveyor 180 and another trailer can be unloaded in the grain cart 10 to be loaded into railcar 150.

If the grain cart 10 finishes loading one railcar 150, the operator of the tow vehicle 170 can tow the grain cart 10 to the next railcar 150 and being loading another railcar 150.

The grain cart 10 can often travel where a truck could never go and in all weather conditions. This is especially true if the grain cart 10 is provided with tracks, especially high floatation rubber tracks. Additionally, the tow vehicle 170 can be a tractor that has tracks 172, making the grain cart 10 and tow vehicle 170 able to travel over all sorts of different terrain. Instead of having to extensively prepare the siding for all season truck operation, the conveyor 190 can be placed at location near the railcars 150, but still at a place that is accessibly by truck and the grain cart 10 and tow vehicle 170 used to load the railcars 150.

Additionally, during the loading, the railcars 150 can remain stationary, even with the breaks engaged on the railcars 150 and the grain cart 10 can be moved by the tow vehicle 170 to the different railcars 150 for loading.

Not only can the load cells 42 be used to determine how much crop material has been loaded into the grain cart 10, but the load cells 42 can also be used to determine how much crop material is being loaded into railcars 150 and used to more accurately load the railcar 150 with a desired weight of crop material. A railcar will typically have a maximum weight limit that a railway does not want exceeded. If this maximum weight limit is exceeded, the railroad may insist that the railcar be unloaded (or at least unloaded down to the maximum weight) and a fine may be imposed on the owner of the load. It is therefore often quite desirable not to exceed this maximum weight limit. However, conversely, it is also undesirable to be too far below this maximum weight limit. The lower the final weight of crop material in the railcar is below the maximum weight the more crop material that could have been loaded in the railcar but was not and money can be wasted because you typically pay a set amount for a railcar and not an amount based on the weight of the load in a railcar. Ideally, the railcar should be loaded with crop material as close as possible to the maximum weight without going over in order to transport as much crop material in each railcar as possible.

Figure 8:
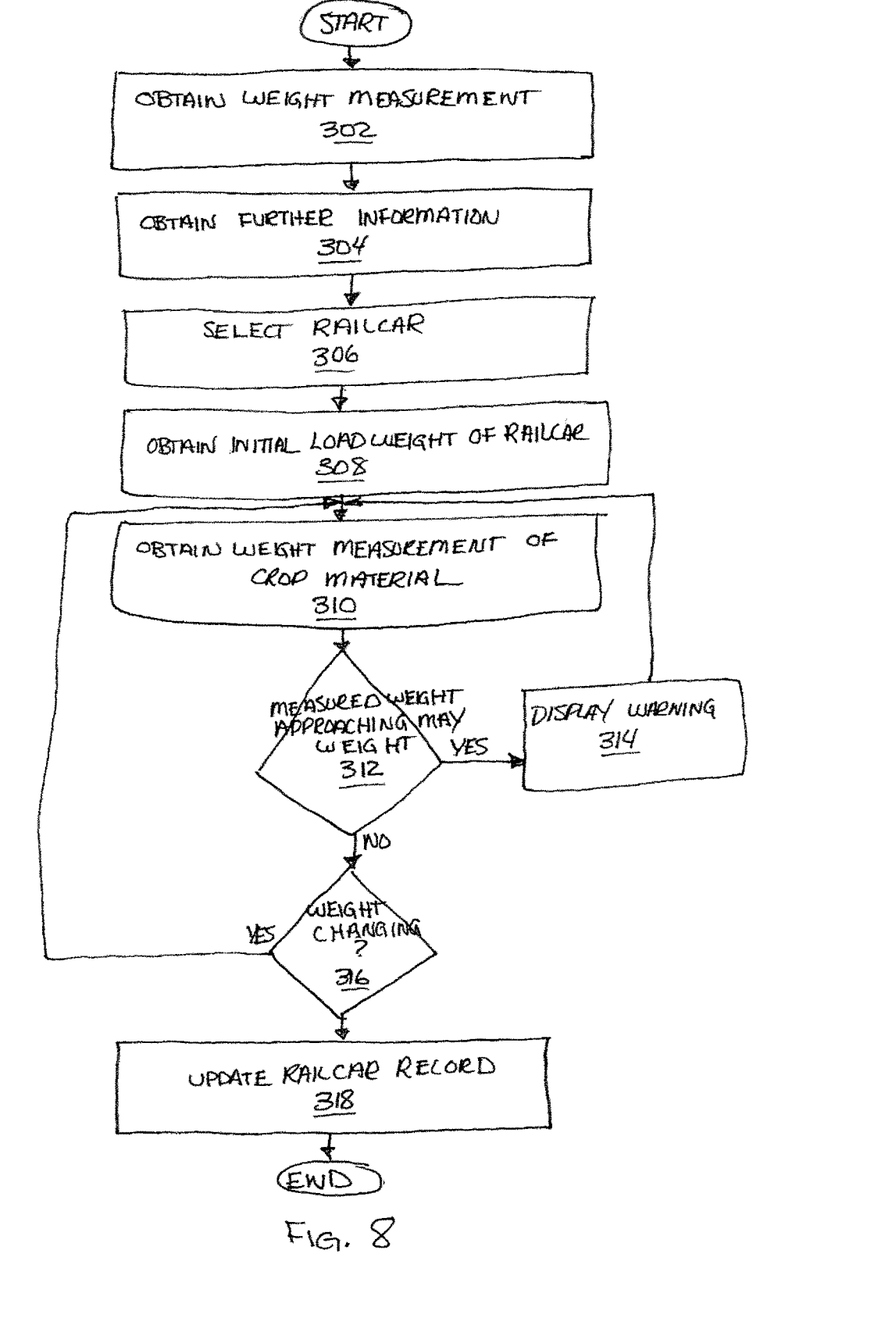
FIG. 8 illustrates a flowchart of a method for filling a railcar to near its maximum allowable weight with crop material.

FIG. 8 illustrates a method of determining how much crop material is loaded into each railcar 150 and loading a railcar 150 with crop material near its maximum allowable transport weight. An operator of the tow vehicle 170 can have the data processing system 200 with him or her in the cab of the tow vehicle 170 and use the data processing system 200 during the loading process. The data processing device 200 can be used to display information about the loading process as well as store information about loads that have been loaded into the different railcars 150.

Figure 9:
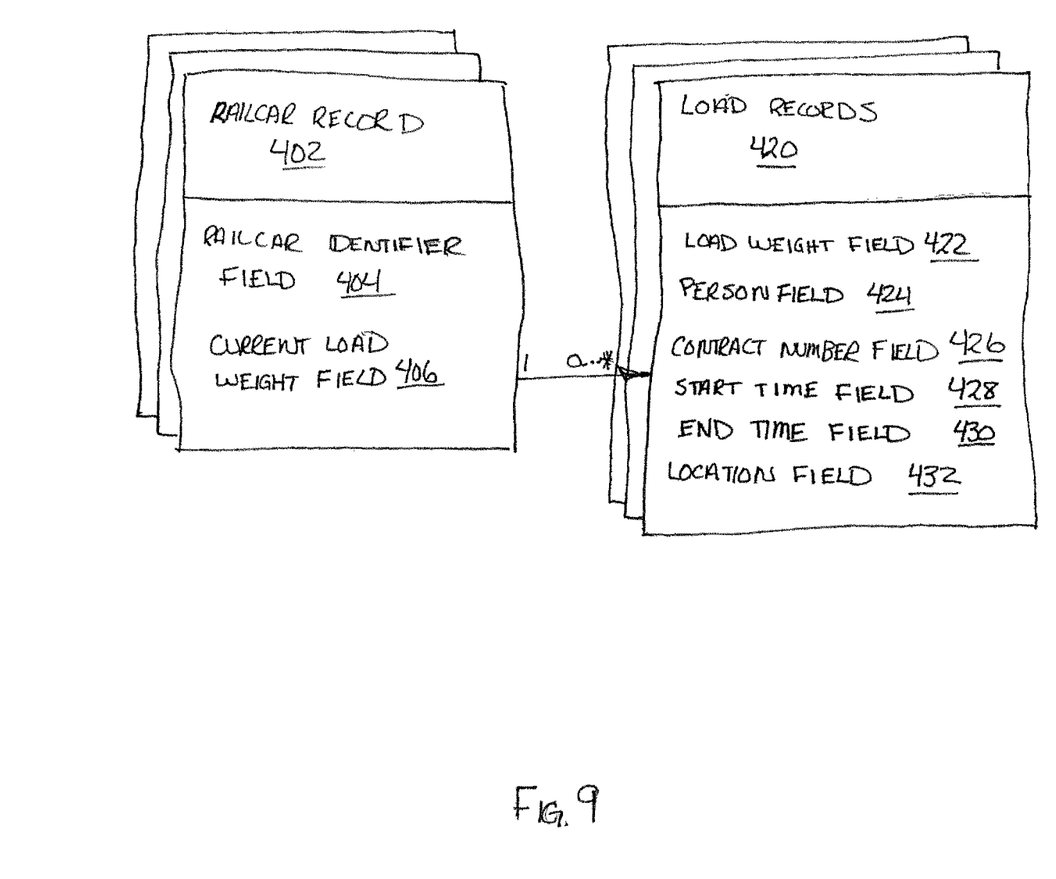
FIG. 9 illustrates a logical diagram of a data structure that can be stored in the memory of a data processing device for tracking crop material that has been loaded into railcars by the grain cart of FIGS. 1-5.

FIG. 9 illustrates a logic diagram illustrating an exemplary data structure that can be used for storing the information about the crop material loaded into the railcars 150. This data structure can be used in conjunction with the method shown in FIG. 8. A number of railcar records 402 can be stored, where each railcar record 402 corresponds to a railcar 150 that is positioned on the tracks 180 and is or will be loaded by the grain cart 10. Each railcar record 402 can contain a railcar identifier field 404 that can be used to store an identifier of the railcar 150 that corresponds to the railcar record 402. Each railcar record 402 can also contain a current load weight field 406 that stores a number indicating the current weight of a load in the railcar 150 the railcar record 402 corresponds to. If no crop material has been loaded into the railcar 150 corresponding to a railcar record 402 than this field will typically indicate that there no load or that the current load weight of the railcar 150 is zero. If crop material has already been loaded into the railcar 150 that corresponds with the railcar record 402, then this field can contain the weight of the crop material currently in the railcar 150.

In addition to their being a number of railcar records 402, each railcar record 402 can be associated with a number of load records 420 where each load record 420 corresponds to a load that has been loaded into the railcar 150 that corresponds with the railcar record 402. As the railcar 150 associated with the railcar record 402 is loaded with loads from the grain cart 20, each load can correspond to a load record 420. This load record 420 can contain information regarding each of these loads, including a person field 424 for storing an indicator of the person who supplied the crop material, such as the farmer; a contract number field 426 for storing a contract number that the crop material is being provided under; a start time field 428 for storing a date and time the loading of the load of crop material started; and an end time field 430 for storing a date and time that the loading of the load was finished. In one aspect, each load record 420 can include a location field 432 that stores a location indicator, such as GPS coordinators, that indicates where the load was loaded.

Referring again to FIG. 8, the operator of the tow vehicle 170 can maneuver the grain cart 10 to a position near a truck 100 and trailer 110 and load the grain cart 10 with crop material or other particulate material from the trailer 110 using the conveyor 190. The loading of the grain cart 10 from the trailer 110 can be accomplished when either the entire contents of the trailer 110 is unloaded into the storage container 20 of the grain cart 10 or the storage container 20 of the grain cart 10 has been filled to capacity from the trailer 110 and cannot receive any more crop material. With the grain cart 10 loaded, the method can start and at step 302 a starting weight measurement of the crop material loaded into the storage container 20 can be obtained by the data processing device 200. This starting weight measurement can be obtained by having a measurement of the weight taken by the load cells 42 transmitted to the data processing device 200. This starting weight measurement will allow the weight of the load of crop material in the grain cart 10 to be determined.

At step 304 any further information related to the load in the grain cart 10 can be entered into the data processing device 200. In one aspect, this could be a contract number the crop material is being supplied under and/or the person providing the crop material, such as a farmer bringing their crop material to be loaded.

At step 306 a railcar 150 that will be loaded with the crop material in the grain cart 10 can be selected. The operator can use the data processing device 200 to select which of the railcars 150 will be loaded with the crop material currently in the grain cart 10. A list of railcars 150 can be stored in the memory 202 of the data processing device 200 and a railcar record 402 corresponding to the selected railcar 150 can be accessed by the data processing device 200 and at step 308 the initial load weight in the selected railcar 150 obtained. This initial load weight in the selected railcar 150 could be obtained from the current load weight field 406 in the railcar record 402 corresponding to the selected railcar 150 and can be the weight of crop material that has already been loaded into the selected railcar 150 by previous loads. If no crop material has been loaded in the selected railcar 150 (i.e. the selected railcar 150 is currently empty), then the current load weight can be zero. Alternatively, if loads have previously been loaded into the selected railcar 150 this will be the total weight of the crop material that has been loaded into the selected railcar 150 by the previous loads.

The operator of the tow vehicle 170 can then maneuver the grain cart 10 adjacent to the railcar 150 selected at step 306 and begin to load the selected railcar 150 with crop material from the grain cart 10 using the auger assembly 60. The method can move on to step 310 and the data processing device 200 can continue to obtain weight measurements of the crop material remaining in the storage container 20 of the grain cart 10 as the crop material is discharged into the selected railcar 150. These weight measurements can be obtained by having the load cells 42 on the grain cart 10 repeatedly transmitting weight measurements of the crop material remaining in the storage container 20 of the grain cart 10 to the data processing system 200. Because crop material is continuously being removed from the storage container 20 by the auger assembly 60 and discharged into the railcar 150 during the loading of the selected railcar 150 by the grain cart 10, these measured weight values will continue to decrease over time as the crop material continues to be removed from the grain cart 10 and discharged into the selected railcar 150.

The data processing device 200 can determine the current load weight in the selected railcar 150, which will be the amount of crop material that has been loaded into the selected railcar 150 (including any previous loads of crop material) at any time during the unloading of the grain cart 20, by taking the initial load weight in the railcar that was obtained at step 308, adding the starting weight measurement of the loaded grain cart 10 obtained at step 302 and subtracting the currently measured weight of the crop material in the grain cart 20 taken at step 310. As crop material is unloaded from the storage container 20 of the grain cart 10, the weight measurements taken by the load cells 42 and transmitted to the data processing device 200 will continue to decrease. At any time, taking the starting weight measurement of the crop material in the grain cart 10 obtained at step 302 and subtracting the current measured weight of the crop material in the grain cart 10 will result in the weight of crop material from the grain cart 10 that has already been loaded into the selected railcar 150. This weight of crop material already loaded into the selected railcar 150 from the grain cart 10 can be added to the initial load weight of the selected railcar 150 to determine the current load weight of crop material in the railcar 150 at any specific time during the loading. In one aspect, this current load weight can be displayed on the data processing device 200 to show the operator the current load weight of crop material in the selected railcar 150 at any specific time during the unloading of the grain cart 10. This displayed numbers will continuously increase as more crop material is unloaded from the grain cart 10 into the selected railcar 150. Depending on the frequency weight measurements are taken by the load cells 42 and transmitted to the data processing device 200, this displayed current load weight could be displayed in substantially real-time.

The method will continue to repeatedly: obtain weight measurements at step 310; check to see if the load weight of the selected railcar 150 is approaching its maximum load value at step 312; and check to see if the weight measurements have stopped changing at step 316. As the crop material is unloaded from the grain cart 10 into the selected railcar 150, the data processing device 200 will check at step 316 to see if the weight measurements have stopped changing for a period of time. If the weight measurements continue to change (i.e. the weight of the measurements continue to decrease indicating that crop material is still being unloaded from the grain cart 10), the method will continue to repeat step 310 and obtain weight measurements, move onto step 312 followed by checking to see if the weight is changing at step 316. This repeating of these steps will result in weight measurements of the remaining crop material in the grain cart 10 being continuously obtained and transmitted to the data processing device 200 during the unloading of the crop material from the grain cart 10 so that the data processing device 200 can use them to repeatedly determine the current load weight in the selected railcar 150. However, once all of the crop material has been unloaded from the grain cart 10, the weight measurements being taken will reach a steady value and will stop decreasing because no more crop material is being unloaded from the grain cart 10. At this point, the grain cart 10 is empty and the method will determine at step 316 that the measured weights are no longer changing and move onto step 318.

In one aspect, the method can include a step 312 that checks to see if the current load weight in the selected railcar 150 is approaching a maximum load weight that the railcar 150 can carry. If the current load weight of crop material in the selected rail car 150 is approaching the maximum weight for the selected railcar, the method can move to step 314 and display a warning to the operator on the touch screen 230 of the data processing device 200 so that the operator can begin to stop the auger assembly 60 and stop unloading crop material from the grain cart 10 into the selected railcar 150 so that the crop material in the railcar does not exceed the maximum load weight of the selected railcar 150. In one aspect, this warning at step 314 can be done some time in advance of the selected railcar 150 reaching its maximum load weight of the selected railcar 150 to allow time for the auger assembly 60 to be stopped.

After step 314 the method can repeat steps 310 and 316 as the operator auger assembly 60 and after the auger assembly 60 is stopped no more crop material will be unloaded from the grain cart 10. The measured weights being obtained from the load cells 42 by the data processing device 200 will stop decreasing after the auger assembly 60 has been stopped and at step 316 the method can observe that the measured weights are remaining constant and can move on to step 318.

After the crop material has all been unloaded from the grain cart 10 into the selected railcar 150 or an operator has stopped unloading the crop material in the grain cart 10 and the method has moved to step 318, at step 318 the data processing device can update the information stored in its memory 202 and the method can end. Referring to FIG. 9, the current load weight in the current load weight field 406 of the railcar record 402 corresponding to the selected railcar 150 can be updated with the new load weight of crop material in the selected railcar 150. The new load weight of crop material in the railcar 150 will be the load weight of crop material that was already in the selected railcar 150 before the grain cart 10 was unloaded into it plus the crop material that was just loaded into it from the grain cart 150 during the method shown in FIG. 8. Additionally, a new load record 420 can be created and associated with the railcar record 402. The information for the fields in this load record 420 can be obtained from some of the information obtained at step 304 of the method shown in FIG. 8 and from information obtained/recorded by the data processing device 200 during the performance of the method.

At the end of the method shown in FIG. 8, a load will have been loaded into one of the selected railcars 150 and a new current load weight for the selected railcar 150 determined.

Additional information can also be stored in the data processing device related to the recent load. An operator of the tractor 170 and grain cart 10 can then go and get another load of crop material from the same truck 100 and trailer 110 or a next or different truck 100 and trailer 110 and the method shown in FIG. 8 can begin again with this next load. In this manner, an operator of the tractor 170 towing the grain cart 10 can repeatedly load the grain cart 10 with different loads of crop material and then load the crop material into various railcars 150 with the method shown in FIG. 8 being performed each time. If one farmer is hauling multiple trailer or truck loads from his or her farm to be loaded on the railcars 150, the operator of the tow vehicle 170 can select the same railcar 150 each time so that all of that farmer's crop material is loaded in the same railcar even though other farmers loads might be loaded into other railcars 150 while the farmer travels back to his or her farm to collect the next load and bring it back to be loaded into the railcar 150. When all of the railcars 150 are loaded, the memory 202 of the data processing device 200 can contain information indicating the load weights of all of the different railcars 150 that have been loaded (the railcar records 402) as well as information about each of the individual loads that were loaded into the railcars 150 (the load records 420). This information can then be maintained on the data processing device 200 or in some aspects transferred or uploaded to a remote device for storage and/or review and to keep precise records of the loading of the railcars 150.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A method for loading a railcar with crop material, the method comprising:

providing a tow vehicle having a cab from which an operator controls the tow vehicle;

providing a grain cart connected to the tow vehicle by a hitch assembly, the grain cart comprising a frame, ground wheels supporting the frame, the hitch assembly connected to the frame, a storage container supported by the frame, an auger assembly having an intake end, a main body and a discharge end, the intake end extending into the storage container so that particulate material from the storage container can enter the intake end, be carried up the main body and discharged out the discharge end, the discharge end pivotally connected to the main body, and a spout moveably connected to the discharge end of the auger, wherein the spout is remotely moveable, by the operator in the cab of the tow vehicle, relative to the discharge end of the auger to discharge particulate material closer to and further away from the grain cart, and wherein the spout is remotely moveable, by the operator in the cab of the tow vehicle, to pivot the spout and the discharge end relative to the main body of the auger assembly;

loading the storage container of the grain cart with crop material;

the operator maneuvering the grain cart adjacent to a railcar using the tow vehicle with the discharge end over an opening in the railcar;

while the railcar remains stationary, the operator moving the spout relative to the discharge end of the auger remotely from the cab of the tow vehicle to direct discharging crop material into the opening on the railcar;

while the railcar remains stationary, the operating rotating the discharge end of the auger relative to the main body of the auger remotely from the cab of the tow vehicle to direct discharging crop material into the opening on the railcar; and discharging crop material from the storage container of the grain cart into the railcar, while the railcar remains stationary, using the auger assembly of the grain cart.

2. The method of claim 1 further comprising, after the storage container is loaded with crop material, weighing the crop material in the storage container using load cells provided on the grain cart.

3. The method of claim 1 further comprising providing a video camera aimed at crop material discharging from the spout and using images captured by the video camera to maneuver the discharge end of the auger assembly over the opening in the railcar.

4. The method of claim 3 wherein images captured by the video camera are used by the operator to maneuver the spout relative to the discharge end.

5. The method of claim 1 further comprising, when the railcar is full, using the tow vehicle to maneuver the grain cart adjacent to a second railcar with the discharge end of the auger assembly positioned over an opening in the second railcar while the railcar and the second railcar remain stationary, and discharging crop material from the storage container into the second railcar.

6. The method of claim 1 further comprising providing a data processing device operative to receive weight measurements of the crop material in the grain cart and while the crop material is being discharged into the railcar, using the data processing device to repeatedly obtain weight measurements of the crop material remaining in the grain cart and using the obtained weight measurements of the crop material remaining in the grain cart to determine a weight of crop material in the railcar.

7. The method of claim 6 further comprising using the data processing device to obtain a starting weight of crop material in the grain cart after the grain cart is loaded with crop material and before discharging the crop material into the railcar.

8. The method of claim 7 wherein the weight of crop material in the railcar is determined by subtracting a currently measured weight of crop material in the grain car from the starting weight of crop material in the grain cart and adding a result to an initial weight of crop material in the railcar.

9. The method of claim 7 further comprising when the measured weight of crop material in the grain cart stops changing for a period of time, saving the load weight of crop material in the railcar in a memory of the data processing device.

* * * * *